US010229375B2

(12) United States Patent
Davidson et al.

(10) Patent No.: US 10,229,375 B2
(45) Date of Patent: *Mar. 12, 2019

(54) MONITORING RECURRING ACTIVITIES AND LOCATIONS OF WORKERS

(71) Applicant: UNITED PARCEL SERVICE OF AMERICA, INC., Atlanta, GA (US)

(72) Inventors: Mark J. Davidson, Alpharetta, GA (US); Christopher T. Schenken, Alpharetta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 89 days.

This patent is subject to a terminal disclaimer.

(21) Appl. No.: 13/921,500

(22) Filed: Jun. 19, 2013

(65) Prior Publication Data
US 2014/0278645 A1 Sep. 18, 2014

Related U.S. Application Data

(63) Continuation-in-part of application No. 13/795,568, filed on Mar. 12, 2013.

(51) Int. Cl.
G06Q 10/00 (2012.01)
G06Q 10/06 (2012.01)
G06Q 10/08 (2012.01)

(52) U.S. Cl.
CPC ..... *G06Q 10/063114* (2013.01); *G06Q 10/08* (2013.01)

(58) Field of Classification Search
None
See application file for complete search history.

(56) References Cited

U.S. PATENT DOCUMENTS

| 4,819,162 | A | * | 4/1989 | Webb, Jr. | G06Q 10/109 235/377 |
| 5,045,839 | A | * | 9/1991 | Ellis | G08B 25/016 340/309.7 |
| 6,044,142 | A | * | 3/2000 | Hammarstrom | H04M 3/51 379/201.01 |
| 8,081,749 | B1 | * | 12/2011 | Shaffer | H04M 3/523 379/215.01 |
| 8,306,854 | B1 | * | 11/2012 | Bray | G06Q 10/0633 705/32 |
| 2003/0050978 | A1 | * | 3/2003 | Cannon | H04L 67/16 709/204 |
| 2004/0117443 | A1 | * | 6/2004 | Barsness | G06Q 10/10 709/204 |

(Continued)

OTHER PUBLICATIONS

Telogis Fleet Management Software, Jan. 5, 2012, http://web.archive.org/web/20120105042154/http://www.telogis.com/solutions/fleet.*

(Continued)

*Primary Examiner* — Eric W Stamber
*Assistant Examiner* — Joseph M Waesco
(74) *Attorney, Agent, or Firm* — Shook, Hardy & Bacon, L.L.P.

(57) ABSTRACT

Computer program products, methods, systems, apparatus, and computing entities are provided for monitoring recurring activities. In one embodiment, activity data, worker data, and location data can be analyzed to identify segments of interest. The identified segments can then be provided for an interface for display.

27 Claims, 13 Drawing Sheets

(56) References Cited

U.S. PATENT DOCUMENTS

| | | | | |
|---|---|---|---|---|
| 2005/0119863 | A1* | 6/2005 | Buikema | G05B 19/4184 702/188 |
| 2006/0089890 | A1* | 4/2006 | Campbell | G06Q 30/04 705/34 |
| 2006/0200008 | A1* | 9/2006 | Moore-Ede | B60K 28/06 600/300 |
| 2006/0235739 | A1* | 10/2006 | Levis | G06Q 10/08 705/1.1 |
| 2008/0059278 | A1* | 3/2008 | Medina | G06Q 10/06 705/7.14 |
| 2008/0301296 | A1* | 12/2008 | York | G06Q 10/06 709/225 |
| 2009/0271762 | A1* | 10/2009 | Taylor | G06F 21/6227 717/107 |
| 2010/0042706 | A1* | 2/2010 | Prieto | G06Q 10/06 709/221 |
| 2010/0324964 | A1* | 12/2010 | Callanan | G06Q 10/06 705/322 |
| 2010/0332293 | A1* | 12/2010 | Merchant | G06Q 10/06375 705/7.37 |
| 2012/0239452 | A1* | 9/2012 | Trivedi | G06Q 10/00 705/7.22 |
| 2013/0021174 | A1* | 1/2013 | Silzer, Sr. | G05D 1/0278 340/989 |

OTHER PUBLICATIONS

United States Patent and Trademark Office, Office Action for U.S. Appl. No. 13/795,568, dated Jul. 23, 2015, 20 pages, USA.
United States Patent and Trademark Office, Office Action for U.S. Appl. No. 13/795,568, dated Apr. 1, 2015, 14 pages, USA.
United States Patent and Trademark Office, Office Action for U.S. Appl. No. 13/795,568, dated Feb. 3, 2016, 22 pages, USA.
United States Patent and Trademark Office, Office Action for U.S. Appl. No. 13/795,568, dated Dec. 26, 2014, 11 pages, USA.
United States Patent and Trademark Office, Office Action for U.S. Appl. No. 13/795,568, dated Sep. 15, 2016, 25 pages, USA.
United States Patent and Trademark Office, Office Action for U.S. Appl. No. 13/795,568, dated Feb. 23, 2017, 25 pages, USA.
Non-Final Rejection dated Jun. 27, 2017 for U.S. Appl. No. 13/795,568.
Final Rejection dated Oct. 30, 2017 for U.S. Appl. No. 13/795,568.

* cited by examiner

```
<?xml version="1.0" encoding="utf-8"?>
<Package>
    <TrackingNumber>1Z123456789</TrackingNumber>
    <ScanEvents>
        <ScanEvent1>
            <Country>USA</Country>
            <State>Georgia</State>
            <City>Roswell</City>
            <Facility>Roswell_12R</Facility>
            <Container>Trailer_8ZR13547GF</Container>
            <Time>2013-11-09 T 11:20:35 UTC</Time>
            <EmployeeID>E8675309</EmployeeID>
        </ScanEvent1>
    </ScanEvents>
</Package>
```

Fig. 5

```
<?xml version="1.0" encoding="utf-8"?>
<Package>
    <TrackingNumber>1Z987654321</TrackingNumber>
    <ScanEvents>
        <ScanEvent1>
            <Country>USA</Country>
            <State>Georgia</State>
            <City>Roswell</City>
            <Facility>Roswell_12R</Facility>
            <Container>Trailer_8ZR13547GF</Container>
            <Time>2013-11-09 T 11:20:47 UTC</Time>
            <EmployeeID>E8675309</EmployeeID>
        </ScanEvent1>
    </ScanEvents>
</Package>
```

Fig. 6

```
<?xml version="1.0" encoding="utf-8"?>
<Order>
    <OrderInfo>
        <OrderNumber>1634</OrderNumber>
        <OrderEntered>2013-11-09 T 17:20:00 UTC</OrderEntered>
        <OrderCompleted>2013-11-09 T 17:37:01 UTC</OrderCompleted>
        <Items>
            <Entrée1>Baked Chicken</Entrée1>
            <Side1>Fresh Greens</Side1>
            <Entrée2>Seared Halibut</Entrée2>
            <Side2>Creamed Corn</Side2>
        </Items>
        <ServerID>S128</ServerID>
        <ChefID>C593</ChefID>
    </OrderInfo>
</Order>
```

Fig. 7

```xml
<?xml version="1.0" encoding="utf-8"?>
<Order>
    <OrderInfo>
        <OrderNumber>1642</OrderNumber>
        <OrderEntered>2013-11-09 T 17:26:17 UTC</OrderEntered>
        <OrderCompleted>2013-11-09 T 17:59:46 UTC</OrderCompleted>
        <Items>
            <Entrée1>Flank Steak</Entrée1>
            <Side1>Mashed Potatoes</Side1>
        </Items>
        <ServerID>S993</ServerID>
        <ChefID>C593</ChefID>
    </OrderInfo>
</Order>
```

Fig. 8

```
<?xml version="1.0" encoding="utf-8"?>
<WorkPeriod>
  <EmployeeID>E8675309</EmployeeID>
  <PeriodInfo>
    <Date>2013-11-09</Date>
    <TimeStart>12:00:00</TimeStart>
    <TimeEnd>18:03:46</TimeEnd>
    <Inactivity1>
      <ReasonCode>11</ReasonCode>
      <TimeStart>15:13:17</TimeStart>
      <TimeEnd>15:33:46</TimeEnd>
    </Inactivity1>
    <LocationEvents>
      <LocationEvent1>entryway 12IUX, 12:00:00</LocationEvent1>
      <LocationEvent2>restroom 7, 15:13:17</LocationEvent2>
      <LocationEvent3>hallway 27GF3, 15:25:17</LocationEvent3>
      <LocationEvent4>entryway 12IUX, 18:03:46</LocationEvent4>
    </LocationEvents >
    <Lunch>14:09:46 – 14:40:23</Lunch>
  </PeriodInfo>
</WorkPeriod>
```

Fig. 9

```
<?xml version="1.0" encoding="utf-8"?>
<WorkPeriod>
    <EmployeeID>C593</EmployeeID>
    <PeriodInfo>
        <Date>2013-11-09</Date>
        <TimeStart>14:00:00</TimeStart>
        <TimeEnd>23:19:11</TimeEnd>
        <Break1>15:39:46 – 15:50:23</Break1>
        <Break2>17:11:43 – 17:39:56</Break2>
        <Break3>21:42:46 – 22:07:35</Break3>
        <LocationEvent1>entryway 12IUX, 14:00:00</LocationEvent1>
        <LocationEvent2>kitchen 1, 17:37:01</LocationEvent2>
        <LocationEvent3>kitchen 1, 17:59:46</LocationEvent3>
        <LocationEvent4>entryway 12IUX, 23:19:11</LocationEvent4>
    </PeriodInfo>
</WorkPeriod>
```

Fig. 10

MONITORING RECURRING ACTIVITIES AND LOCATIONS OF WORKERS

CROSS-REFERENCE TO RELATED APPLICATIONS

This application is a continuation in part of U.S. application Ser. No. 13/795,568 filed Mar. 12, 2013, which is hereby incorporated herein in its entirety by reference.

BACKGROUND

Various business entities have workers that performed recurring activities. A need exists for monitoring the efficiency and location of such workers.

BRIEF SUMMARY

In general, embodiments of the present invention provide methods, apparatus, systems, computing devices, computing entities, and/or the like for monitoring recurring activities.

In accordance with one aspect, a method for monitoring recurring activities is provided. In one embodiment, the method comprises (1) receiving activity data and location data corresponding to a worker and a work period in which the worker performed one or more recurring activities; (2) identifying one or more inactivity segments during the work period that meet a configurable threshold based at least in part on the activity data, the one or more inactivity segments representing a time period for which the worker did not perform sufficient recurring activities during the work period; and (3) identifying a location for at least one of the one or more inactivity segments.

In accordance with another aspect, a computer program product for monitoring recurring activities is provided. The computer program product may comprise at least one computer-readable storage medium having computer-readable program code portions stored therein, the computer-readable program code portions comprising executable portions configured to (1) receive activity data and location data corresponding to a worker and a work period in which the worker performed one or more recurring activities; (2) identify one or more inactivity segments during the work period that meet a configurable threshold based at least in part on the activity data, the one or more inactivity segments representing a time period for which the worker did not perform sufficient recurring activities during the work period; and (3) identify a location for at least one of the one or more inactivity segments.

In accordance with yet another aspect, an apparatus comprising at least one processor and at least one memory including computer program code is provided. In one embodiment, the at least one memory and the computer program code may be configured to, with the processor, cause the apparatus to (1) receive activity data and location data corresponding to a worker and a work period in which the worker performed one or more recurring activities; (2) identify one or more inactivity segments during the work period that meet a configurable threshold based at least in part on the activity data, the one or more inactivity segments representing a time period for which the worker did not perform sufficient recurring activities during the work period; and (3) identify a location for at least one of the one or more inactivity segments.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 5-13 show exemplary input and output that can be produced in accordance with various embodiments of the present invention.

DETAILED DESCRIPTION

Figure 1:
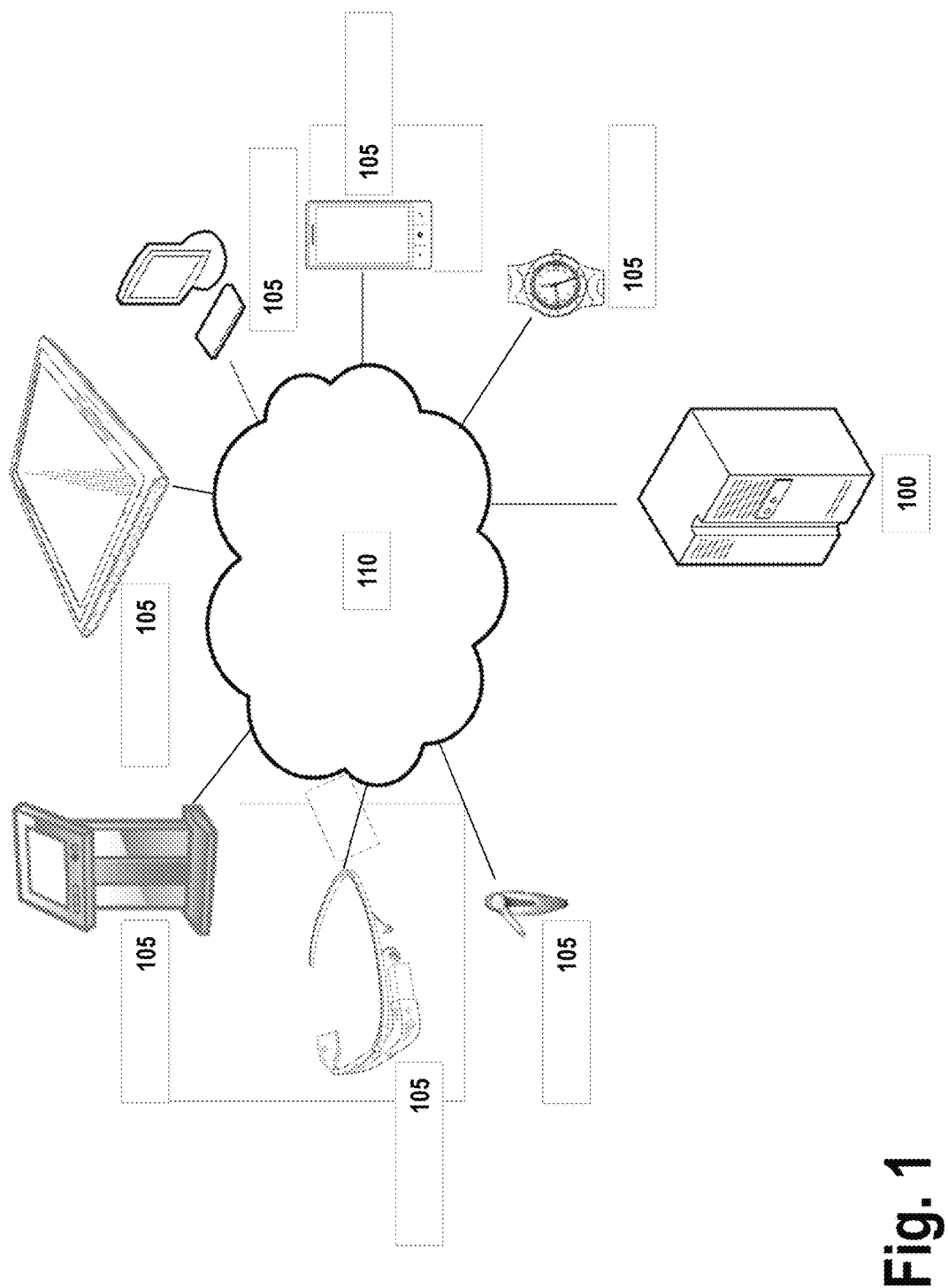
FIG. 1 is an overview of a system that can be used to practice embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. Computer Program Products, Methods, and Computing Entities

Embodiments of the present invention may be implemented in various ways, including as computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory, multimedia memory cards (MMC), secure digital (SD) memory cards, Memory Sticks, and/or the like. Further, a non-volatile computer-readable storage medium may also include conductive-bridging random access memory (CBRAM), phase-change random access memory (PRAM), ferroelectric random-access memory (FeRAM), resistive random-access memory (RRAM), Silicon-Oxide-Nitride-Oxide-Silicon memory (SONOS), racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Rambus in-line memory module (RIMM), dual in-line memory module (DIMM), single in-line memory module (SIMM), video random access memory VRAM, cache memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Embodiments of the present invention are described below with reference to block diagrams and flowchart illustrations. Thus, it should be understood that each block of the block diagrams and flowchart illustrations, respectively, may be implemented in the form of a computer program product, an entirely hardware embodiment, a combination of hardware and computer program products, and/or apparatus, systems, computing devices, computing entities, and/or the like carrying out instructions on a computer-readable storage medium for execution. Such embodiments can produce specifically-configured machines performing the steps or operations specified in the block diagrams and flowchart illustrations. Accordingly, the block diagrams and flowchart illustrations support various combinations of embodiments for performing the specified steps or operations.

II. Exemplary System Architecture

FIG. 1 provides an illustration of an exemplary embodiment of the present invention. As shown in FIG. 1, this particular embodiment may include one or more monitoring computing entities 100, one or more user/worker computing entities 105, one or more networks 110, one or more imaging devices (not shown), one or more radio frequency identification (RFID) readers/interrogators (not shown), one or more Global Positioning System (GPS) satellites, and/or the like. Each of these components, entities, readers, devices, systems, and similar words used herein interchangeably may be in direct or indirect communication with, for example, one another over the same or different wired or wireless networks. Additionally, while FIG. 1 illustrates the various entities as separate, standalone entities, the various embodiments are not limited to this particular architecture.

1. Monitoring Computing Entity

Figure 2:
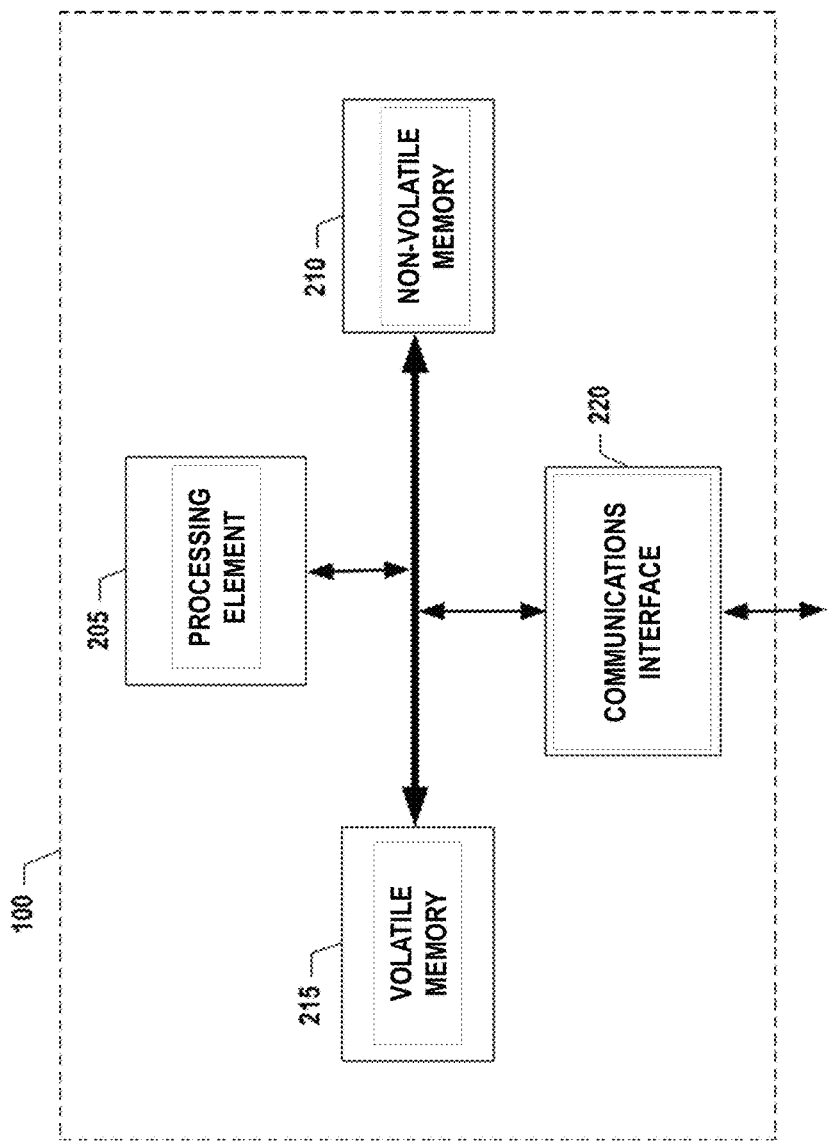
FIG. 2 is an exemplary schematic diagram of a computing entity according to one embodiment of the present invention.

FIG. 2 provides a schematic of a monitoring computing entity 100 according to one embodiment of the present invention. In general, the terms computing entity, entity, device, system, and/or similar words used herein interchangeably may refer to, for example, one or more computers, computing entities, computing devices, mobile phones, desktops, tablets, notebooks, laptops, distributed systems, servers, blades, gateways, switches, processing devices, processing entities, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the monitoring computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. For instance, the monitoring computing entity 100 may communicate with user computing entities 105 to monitor recurring activities and the location of workers/users.

As shown in FIG. 2, in one embodiment, the monitoring computing entity 100 may include or be in communication with one or more processing elements 205 (also referred to as processors, processing circuitry, and/or similar terms used herein interchangeably) that communicate with other elements within the monitoring computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the monitoring computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. Such code may include a monitoring program that analyzes recurring activities, for example. The term database, database instance, database management system, and/or similar terms used herein interchangeably may refer to a structured collection of records or data that is stored in a computer-readable storage medium, such as via a relational database, facial database, hierarchical database, and/or networker database.

In one embodiment, the monitoring computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the monitoring computing entity 100 with the assistance of the processing element 205 and operating system.

As indicated, in one embodiment, the monitoring computing entity 100 may also include one or more communications interfaces 220 for communicating with or various computing entities (e.g., user computing entities 105, imaging devices, RFID readers/interrogators, and/or the like), such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the monitoring computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1X (1xRTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth protocols, wireless universal serial bus (USB) protocols, and/or any other wireless protocol.

Although not shown, the monitoring computing entity 100 may include or be in communication with one or more input elements, such as a keyboard input, a mouse input, a touch screen/display input, audio input, pointing device input, joystick input, keypad input, and/or the like. The monitoring computing entity 100 may also include or be in communication with one or more output elements (not shown), such as audio output, video output, screen/display output, motion output, movement output, and/or the like.

As will be appreciated, one or more of the computing entity's 100 components may be located remotely from other monitoring computing entity 100 components, such as in a distributed system. Furthermore, one or more of the components may be combined and additional components performing functions described herein may be included in the monitoring computing entity 100. Thus, the monitoring computing entity 100 can be adapted to accommodate a variety of needs and circumstances.

2. Exemplary User/Worker Computing Entity

Figure 3:
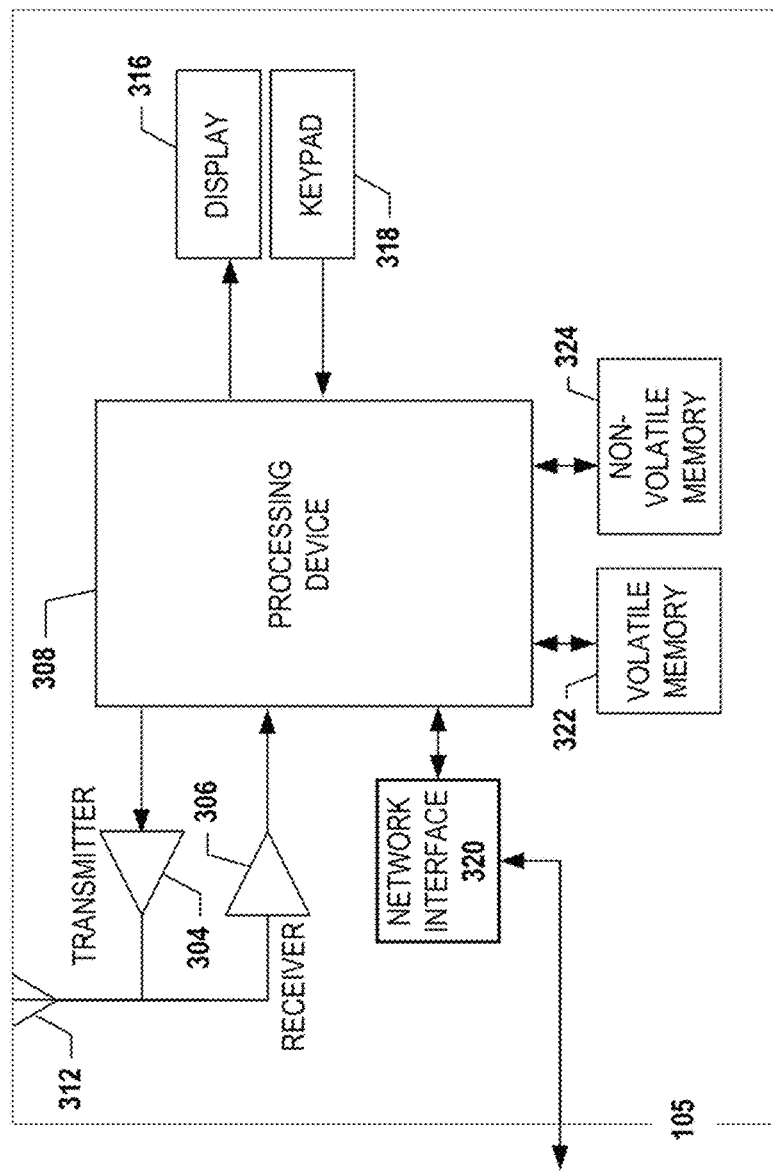
FIG. 3 is an exemplary schematic diagram of a user computing entity according to one embodiment of the present invention.

A user may be an individual, a family, a company, an organization, an entity, a department within an organization, a representative of an organization and/or person, and/or the like. A user may also be a worker and both words (and similar words) are used herein interchangeably. FIG. 3 provides an illustrative schematic representative of a user computing entity 105 that can be used in conjunction with embodiments of the present invention. In general, the terms device, system, computing entity, entity, and/or similar words used herein interchangeably may refer to, for example, one or more computers, computing entities, computing entities, mobile phones, desktops, tablets, notebooks, laptops, distributed systems, watches, glasses, key fobs, radio frequency identification (RFID) tags, ear pieces, scanners, cameras, wristbands, kiosks, input terminals, servers, blades, gateways, switches, processing devices, processing entities, relays, routers, network access points, base stations, the like, and/or any combination of devices or entities adapted to perform the functions, operations, and/or processes described herein. In one embodiment, the user computing entity 105 may be attached to or worn by a user to track or monitor the user's location. Thus, the user computing entities 105 can belong to, be assigned to, or be associated with one or more workers. In one embodiment, the user computing entities 105 may store a unique user/worker identifier (ID) that uniquely identifies the corresponding user. In another embodiment, the user computing entities 105 may require input of a unique user/worker ID to operate the same. The unique user/worker ID may include characters, such as numbers, letters, symbols, and/or the like. For example, an alphanumeric user/worker ID (e.g., C593, E8675309, or S128) may be associated with the corresponding workers/users. Or, there may be user/worker computing entities throughout an establishment or facility for shared use. As shown in FIG. 3, the user computing entity 105 can include an antenna 312, a transmitter 304 (e.g., radio), a receiver 306 (e.g., radio), and a processing element 308 (such as those described above with regard to the monitoring computing entity 100) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user computing entity 105 may be capable of operating with one or more air interface standards, communication protocols, modulation types, and access types. More particularly, the user computing entity 105 may operate in accordance with any of a number of wireless communication standards and protocols, such as those described above with regard to the monitoring computing entity 100, imaging devices, RFID readers/interrogators, pressure sensors, and/or the like. In a particular embodiment, the user computing entity 105 may operate in accordance with multiple wireless communication standards and protocols, such as UMTS, CDMA2000, 1xRTT, WCDMA, TD-SCDMA, LTE, E-UTRAN, EVDO, HSPA, HSDPA, Wi-Fi, WiMAX, UWB, IR, Bluetooth, USB, and/or the like.

Via these communication standards and protocols, the user computing entity 105 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 105 can also download changes, add-ons, and updates, for instance, to its firmware, software (e.g., including executable instructions, applications, program modules), and operating system.

According to one embodiment, the user computing entity 105 may include a location determining device and/or functionality. For example, the user computing entity 105 may include a GPS module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites. Additionally or alternatively, the local device 105 may acquire location data via triangulation in connection with various communication points (e.g., cellular towers, Wi-Fi access points, GPS repeaters, GPS amplifiers, and/or the like) positioned at various locations throughout a geographic area, facility, or work area (e.g., kitchen, cook station, trailer, sorting area, etc.).

The user computing entity 105 may also comprise a user interface (that can include a display 316 coupled to a processing element 308) and/or a user input interface (coupled to a processing element 308). The user input interface can comprise any of a number of devices allowing the user computing entity 105 to receive data, such as a keypad 318 (hard or soft), a touch display, voice or motion interfaces, or other input device. In embodiments including a keypad 318, the keypad 318 can include (or cause display of) the conventional numeric (0-9) and related keys (#, *), and other keys used for operating the user computing entity 105 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 105 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 105.

3. Location Monitoring and/or Tracking Entities

In one embodiment, a geographic area, facility, and/or work area may comprise a variety of computing entities to track workers'/users' locations within and/or outside of a geographic area, facility, and/or work area, such as by determining the location of workers/users using GPS technologies by acquiring, for example, latitude, longitude, altitude, and/or geocode data corresponding to workers/users. Additionally or alternatively, the user computing entity 105 may collect and provide information that allows for a determination of its location (and/or determine its location) via triangulation of various communication points (e.g., cellular towers, Wi-Fi access points, etc.) positioned at locations throughout a geographic area, facility, and/or work area. Such embodiments allow the location and/or movement of users/workers to be monitored and tracked. As will be recognized, a variety of other approaches and techniques can be used to adapt to various needs and circumstances.

As also indicated above, a geographic area, facility, and/or work area may also include one or more imaging devices to track or monitor the location of workers/users. An imaging device may include one or more cameras, one or more laser scanners, one or more infrared scanners, one or more imagers, one or more video cameras, one or more still cameras, one or more Internet Protocol (IP) cameras, and/or the like. Such imaging devices may include one or more wide angle lenses and/or one or more narrow angle lenses. The imaging devices may also include one or more processors and one or more temporary memory storage areas, such as circular buffers. Thus, the imaging devices can capture images (e.g., image data), date and time stamp them, and store them temporarily in the temporary memory storage area or permanently (in a separate memory storage area) within the imaging devices. In one embodiment, the imaging devices may also be connected to (or include) one or more network interfaces (e.g., wired or wireless) for communicating with various computing entities. This communication may be via the same or different wired or wireless networks using a variety of wired or wireless transmission protocols. This may allow the imaging devices to transmit/send images (e.g., image data) they capture (including date and time stamps).

In one embodiment, the imaging devices can be positioned to capture image data in zones of interest in geographic areas, facilities, or work areas (e.g., kitchens, cook stations, trailers, sorting areas, etc.). For example, the imaging devices can be positioned at each door, entryway, hallway, access point, or every 10-15 feet, and/or the like. In one embodiment, the imaging devices may be associated with an imaging device ID or a location ID. The imaging device ID or location ID may include characters, such as numbers, letters, symbols, and/or the like. For example, an alphanumeric imaging device ID or location ID may be entryway 12IUX, work area 17, kitchen 1, imaging device 12, restroom 7, hallway 27GF3, Trailer 8ZR13547 GF, and/or the like.

The imaging data captured by the imaging devices in the zones of interest may include (as determined from analysis) imagery of workers'/users' faces (for use in facial recognition). In one embodiment, for night operation, the imaging devices may have a sensitivity of 0.5 lux or better at an optical stop equivalent of F1. Further, the imaging devices may include or be used in association with various lighting, such as light emitting diodes (LEDs), Infrared lights, array lights, strobe lights, and/or other lighting mechanisms to sufficiently illuminate the zones of interest to capture image data for analysis. The image data can be captured in or converted to a variety of formats, such as Joint Photographic Experts Group (JPEG), Motion JPEG (MJPEG), Moving Picture Experts Group (MPEG), Graphics Interchange Format (GIF), Portable Network Graphics (PNG), Tagged Image File Format (TIFF), bitmap (BMP), H.264, H.263, Flash Video (FLV), Hypertext Markup Language 5 (HTML5), VP6, VP8, and/or the like.

The imaging devices may also be connected to (or include) a network interface (e.g., the wireless Ethernet bridge) for communicating with various computing entities. In one embodiment, the imaging devices can communicate with the monitoring computing entity 100 using protocols and stacks, such as sockets. The network interface may provide the ability for each imaging device to serve as a web host with, for example, web pages that can be used to setup and configure the imaging devices. Moreover, via the web pages (or via the monitoring computing entity 100), the imaging devices can provide a live view of the zones of interest, which can be used to aim and focus the imaging devices. This may also provide the functionality of controlling the exposure, gain, gamma, white balance, compression, and numerous other attributes of the imaging devices. Thus, via the network interface, the imaging devices may provide access for a user to (a) remotely configure (e.g., control the exposure, gain, gamma, and white balance of the images) the imaging devices; (b) remotely access captured images; or (c) synchronize the time on the imaging devices to a consistent network time. Such embodiments allow the location and/or movement of users/workers to be monitored and tracked. As will be recognized, a variety of other approaches and techniques can be used to adapt to various needs and circumstances.

As also indicated above, the work environment may also include one or more RFID readers/interrogators to track or monitor the location of workers/users. As will be recognized, the one or more RFID readers/interrogators may be used to extract information/data stored or collected by the RFID tags/sensors (such as user/worker IDs). For example, the one or more RFID readers/interrogators can transmit/send a signal (e.g., a radio frequency (RF) signal) that prompts and/or powers RFID tags/sensors within a geographical range (e.g., a read range) to provide information/data from the memory of the tags/sensors to the appropriate computing entity or communication interface of the one or more RFID readers/interrogators.

As will be recognized, the read range may vary based on the particular technology being used. For example, in an embodiment using Bluetooth, the read range of a computing entity transmitting/sending a Bluetooth signal/request may be up to 30 feet (whereas a Wi-Fi may provide a read range of 100-300 feet). Thus, RFID tags/sensors within that 30-foot read range may receive the signal/request. Other technologies and protocols may reduce or increase the read range. These technologies and protocols include GPRS, UMTS, CDMA2000, 1xRTT, WCDMA, TD-SCDMA, LTE, E-UTRAN, EVDO, HSPA, HSDPA, Wi-Fi, WiMAX, UWB, IR protocols, USB protocols, and/or any other wireless protocol. In addition to interrogating/reading RFID tags/sensors, these communication capabilities may enable the one or more RFID readers/interrogators to communicate with monitoring computing entities 100, user/worker computing entities 105, imaging devices, and/or the like.

In one embodiment, the RFID readers/interrogators can be positioned throughout facilities or work areas, for example, to track or monitor the location of workers/users. For instance, the RFID readers/interrogators can be positioned at each door, entryway, hallway, access point, or every 10-15 feet, and/or the like. In one embodiment, each RFID reader/interrogator may be associated with an RFID reader/interrogator ID or a location ID. The RFID reader/interrogator ID or location ID may include characters, such as numbers, letters, symbols, and/or the like. For example, an alphanumeric RFID reader/interrogator ID or location ID may be entryway 12IUX, work area 17, kitchen 1, RFID reader/interrogator 32, restroom 7, hallway 27GF3, Trailer 8ZR13547GF, and/or the like. With such positioning, the RFID readers/interrogators can read any appropriate RFID tags that pass within the respective read ranges to track or monitor location movements. Such embodiments allow the location and/or movement of users/workers to be monitored and tracked. As will be recognized, a variety of other approaches and techniques can be used to adapt to various needs and circumstances, such as pressure mats or sensors, and/or the like.

III. Exemplary System Operation

Figure 4:
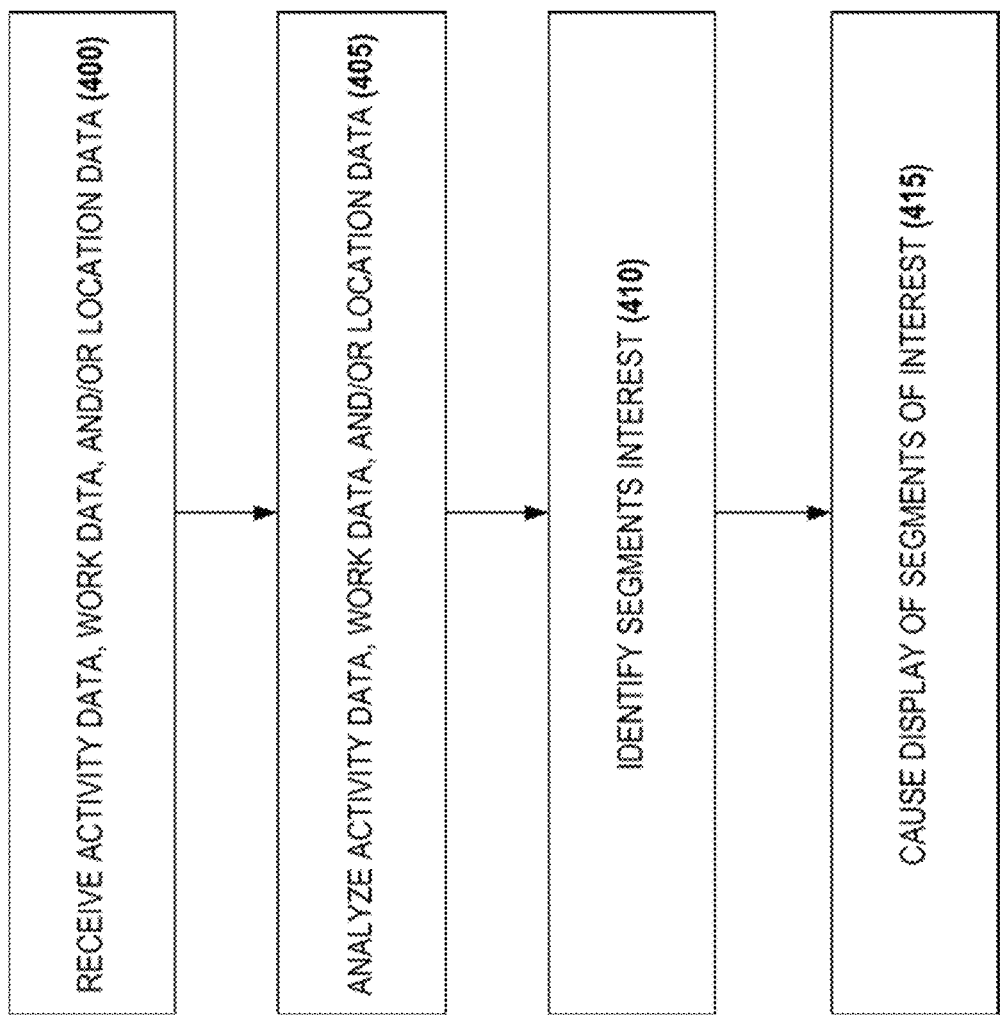
FIG. 4 is a flowchart illustrating operations and processes that can be used in accordance with various embodiments of the present invention.

Reference will now be made to FIGS. 4-13. FIG. 4 is a flowchart illustrating operations and processes that can be used in accordance with various embodiments of the present invention. FIGS. 5-13 show exemplary input and output that can be produced in accordance with various embodiments of the present invention.

1. Recurring Activities

Various embodiments of the present invention can be used to monitor recurring activities of one or more workers, of one or more groups of workers, of one or more employees, of one or more groups of employees, in one or more geographic areas, at one or more locations, at one or more groups of locations, at one or more facilities, at one or more groups of facilities, in one or more work areas, and/or in, of, or at combinations thereof.

As will be recognized, a "recurring" activity may be an activity that is performed periodically, regularly, occasionally, continuously, and/or the like. For example, such activities may include a package loader/unloader for a shipping carrier loading packages into or unloading packages from a container, vehicle, or conveyor belt. Such activities may also include a stockperson stocking shelves in a grocery store, restocking medications in medication cabinets/carts, or stocking inventory in a warehouse. In yet further examples, such reoccurring activities may include checking out customers at a full-service checkout, self-service checkout, or kiosk; scanning or ringing up items as part of a checkout process; packing or bagging items that have been purchased; gift wrapping items that have been purchased; delivering items to customers in-store that were ordered online; washing vehicles; parking vehicles through a valet stand; and/or the like.

In yet other examples, such recurring activities may include assembly line activities, such as attaching items to products; quality monitoring activities, such as ensuring that items or products are within quality standards; order processing, such as pick-and-pack operations monitoring how many orders are processed or how many items are picked and packed; and/or the like. Such activities may also include collecting tolls from patrons of toll roads; embarking or disembarking passengers on airplanes or cruise ships; loading or unloading patrons on rides at amusement parks; and/or the like. Such activities may also include food preparation or serving: preparing or serving entrées, appetizers, desserts, or salads; serving patrons in a cafeteria or other first-in-first-out line; preparing items for use by a particular shift; and/or the like. As will be recognized, embodiments of the present invention can be used with any of a variety activities to adapt to various needs and circumstances.

In one embodiment, to monitor such recurring activities, the monitoring system 100 may create, update, store, and/or have access to worker profiles that correspond to workers who perform, monitor, analyze, and/or supervise such recurring activities. Such worker profiles can be created, edited, and/or customized to adapt to various needs and circumstances. For example, a worker profile may include a worker's ID, name, email addresses, short message service (SMS) addresses, phone numbers, and/or residential address. In addition to biographical information/data, a worker profile may also comprise a worker's/user's primary skill, work/job class, home team of workers (e.g., the worker's department), full-time equivalent value, base rate of pay, hire date, termination date, and/or seniority date. Similarly, a worker profile may also comprise the worker's emergency contact information/data, birthday, languages spoken, driving distance to work, and/or ethnicity. Other information/data could also be stored within a worker profile, such as the worker's certifications or licenses, experience, schedule preferences, religious holidays observed, allergies, and/or physical limitations.

In one embodiment, each worker profile can also be associated with or assigned to one or more worker groups. The worker groups can be used to, for example, group workers who have similar primary skills, work at the same facility, work in the same department within a facility, work on the same team of workers, have similar experience, hold certain certifications, and/or report to a common supervisor. For example, a worker group may comprise all package loaders/unloaders for a shipping carrier or all chefs for a restaurant or restaurant chain. As will be recognized, though, a variety of other approaches and techniques may be used to adapt to various needs and circumstances.

2. Activity Data, Worker Data, and Location Data

In one embodiment, the process may begin with a worker providing input, an indication, or similar words used herein interchangeably that he or she is beginning work. For example, beginning work may be the start of a shift in the morning on a Monday. To provide such an indication, the worker may input some form of the indication via a user computing entity 105. As previously described, a user computing entity 105 may be any of a variety of computing entities that can perform the functions described herein. For instance, to input an indication the he or she is beginning work, the worker may navigate to an application on a mobile device and select an appropriate option. Similarly, the worker may log in to a touch screen kiosk, scan a barcode attached to an employee ID, or depress a specific button on a watch. Even further, such an indication may be provided via audible input through Bluetooth ear piece, selected or input using a mouse or keyboard on a laptop or computer, punched in using a manual timecard or recorded via an electronic time card. Or, such an indication may be provided by turning on glasses worn by the worker, scanning a key fob, scanning using a scanner, taking an image with a camera, or scanning an RFID tag.

Continuing with the above examples of a package loader/unloader for a shipping carrier, the package loader/unloader for the shipping carrier may scan a barcode worn on his person or simply walk past an RFID reader/interrogator that reads an RFID tag on the package loader/unloader. Similarly, a restaurant chef or cook may prepare food near a touch screen through which he or she can login for work. As will be recognized, a variety of other approaches and techniques can be used to adapt to various needs and circumstances.

The indication that the user is beginning work can be provided by the user computing entity 105 to the monitoring computing entity 100 on a periodic, regular, or continuous basis or in response to certain triggers (e.g., performing a recurring activity). The monitoring computing entity 100 can then create, update, revise, and store records comprising worker data and/or location data associated with the workers and their work periods. Such records may be used for monitoring employees and their locations, reviewing work history, payroll, and/or a variety of other items. In one embodiment, the recording of such activity data can trigger the recording of location data that corresponds to the recurring activity that was performed.

In one embodiment, each time a worker performs a recurring activity, the user computing entity 105 can receive or record some form of input (activity data, worker data, and/or location data)—Block 400 of FIG. 4. For example, each time a package loader/unloader for a shipping carrier loads a package into or unloads a package from a container, vehicle, or conveyor belt, the package loader/unloader may scan a label affixed to the exterior of the package to record a location or movement activity for the package. In that regard, the user computing entity 105 may receive and provide this activity and/or information/data to the monitoring computing entity 100, which can create, update, and/or store a record of activity data for the same. An exemplary activity data record representing such an activity is provided in FIG. 5. As can be seen from FIG. 5, the package that was unloaded or loaded has a unique tracking number of 1Z123456789. The record in FIG. 5 also includes information/data regarding the activity performed by the package loader/unloader. For instance, the package was loaded or unloaded at the Roswell Facility (Roswell 12R) located in Roswell, Ga. Further, the package was loaded into or unloaded from Trailer 8ZR13547GF at 11:20:35 on Nov. 11, 2013, by package loader/unloader E8675309. Another exemplary activity data record representing a recurring activity is provided in FIG. 6. As can be seen from FIG. 6, the package that was unloaded or loaded has a unique tracking number of 1Z987654321. The record in FIG. 6 also includes information/data regarding the scan performed by the package loader/unloader. For instance, the package was loaded or unloaded at the Roswell Facility (Roswell 12R) located in Roswell, Ga. Further, the package was loaded into or unloaded from Trailer 8ZR13547GF at 11:20:47 on Nov. 11, 2013, by package loader/unloader E8675309.

In one embodiment, such records may be created, updated, and/or stored to include information/data regarding the various activities. For instance, each time a restaurant chef or cook completes an order (e.g., based on the order number and corresponding information/data being displayed to the chef or cook via a display), he or she may input via a touch screen that the order is complete and ready to be served to the customer. Exemplary records representing such activities are provided in FIGS. 7 and 8. As can be seen from FIG. 7, order number 1634 was input by Server 128 on Nov. 9, 2013, at 17:20:00. The order included two entrées (Baked Chicken and Seared Halibut) and two sides (Fresh Greens and Creamed Corn). Chef or Cook 593 completed order 1634 at 17:37:01. Similarly, as can be seen from FIG. 8, order number 642 was input by Server 993 on Nov. 9, 2013, at 17:26:17. The order included one entrée (Flank Steak) and one side (Mashed Potatoes). Chef or Cook 593 completed order 1642 at 17:59:46.

As noted, each time a worker completes a recurring activity, a user computing entity 105 can receive some form or input such that a corresponding record can be created, updated, and/or stored (Block 400 of FIG. 4). Such input may be received from a worker scanning an item or barcode, depressing a specific button on a watch, providing audible input through Bluetooth ear piece, selecting or inputting information/data using a mouse or keyboard on a laptop or computer, providing input via glasses worn by the worker, scanning a key fob, providing input via touch screen, scanning an RFID tag, and/or the like. The user computing entity 105 can provide such activity data to the monitoring computing entity 100 on a periodic, regular, or continuous basis or in response to certain triggers (e.g., performing a recurring activity). The monitoring computing entity 100 can then create, update, revise, and store records of activity data.

In one embodiment, using similar approaches, workers can provide input via a user computing entity 105 each time they start a break and end a break (worker data)—Block 400 of FIG. 4. The input may specify, for example, the type of break, such as lunch break, smoking break, restroom break, and/or the like. Workers can also input a variety of other information/data, such as when they are performing non-recurring activities at the request of a coworker or supervisor, such as cleaning a work area or repairing work equipment. They may also input information/data as to why they are not performing recurring activities (worker data), such as no packages to load or unload and/or no food items to prepare. And workers can also provide input or indication when they are stopping work for a work period (worker data), such as shift ending as described above with beginning work. In one embodiment, the recording of such data can trigger the recording of location data that corresponds to the recorded input. The user computing entity 105 can provide such worker data to the monitoring computing entity 100 on a periodic, regular, or continuous basis or in response to certain triggers (e.g., performing a recurring activity). The monitoring computing entity 100 can then create, update, revise, and store records of worker data. Such information/data (worker data and/or location data) may be stored in one or more records corresponding to a worker, worker group, work period, and/or the like.

FIGS. 9 and 10 show records comprising worker data for a package loader/unloader and a chef, respectively. As can be seen in FIG. 9, package loader/unloader E8675309 worked from 12:00:00-18:03:46 on Nov. 9, 2013. During this work period, package loader/unloader E8675309 took a lunch break from 14:09:46-14:40:23. Package loader/unloader E8675309 also input that he or she had a period of inactivity from 15:13:17-15:33:46 that corresponds to reason code 11. Reason code 11 may be a particular reason code defined by the carrier, for example, to correspond to any activity. Package loader/unloader E8675309 was also at entryway 121UX at 12:00:00, restroom 7 at 15:13:17, hallway 27GF3 at 15:25:17, and entryway 12IUX at 18:03:46.

As can be seen in FIG. 10, chef C593 worked from 14:00:00-23:19:11 on Nov. 9, 2013. During this work period, chef C593 took three breaks: (1) Break 1 from 15:39:46-15:50:23; (2) Break 2 from 17:11:43-17:39:56; and (3) Break 3 from 21:42:46-22:07:35. Chef C593 was also at entryway 12IUX at 14:00:00, kitchen 1 at 17:37:01, kitchen 1 at 17:59:46, and at entryway 2IUX at 23:19:11. The worker data, the location data, and/or the activity data can be used to determine a variety of information/data about the work habits, performance, productivity, planning, efficiency, and/or the like of employees, plans, organizations, facilities, and/or the like. As will be recognized, a variety of other approaches and techniques can be used to adapt to various needs and circumstance.

As previously described, location data for workers can be collected and stored regularly, periodically, continuously, and/or in response to certain triggers (e.g., performing a recurring activity or performing a non-recurring activity).

For example, in one embodiment, the user computing entity 105 can collect and provide information that allows for a determination of its location (and/or determine its location) regularly, periodically, continuously, and/or in response to certain triggers (e.g., performing a recurring activity)—Block 400 of FIG. 4. For example, every 10 seconds, the user computing entity 105 corresponding to or being worn or used by package loader/unloader E8675309 can collect and provide information that allows for a determination of its location. The user computing entity 105 can then provide such information to the appropriate computing entity (e.g., monitoring computing entity 100) to record the same (e.g., store location data for the worker in association with worker data). For example, the user computing entity can collect and provide latitude, longitude, and/or geocode location information/data to the monitoring computing entity 100 with a date and time stamp, such as 2013-11-09 T 15:13:17 UTC (e.g., using GPS Wi-Fi, or access point systems). The monitoring computing entity 100 can then record the same as the location of E8675309 at 15:13:17 on Nov. 9, 2013, such as in the record shown in FIG. 9.

In another embodiment, for instance, imaging devices can capture image data regularly, periodically, continuously, and/or in response to certain triggers (e.g., performance of recurring activities and/or a person entering or exiting a geofenced area). With captured image data that is date and time stamped, an appropriate computing entity (e.g., monitoring computing entity 100) can analyze the image data to identify workers/users and monitor or track their movements/location throughout a geographic area, facility, and/or work area. To do so, the appropriate computing entity (e.g., monitoring computing entity 100) may employ facial recognition techniques (in coordination with a facial database storing the facial profiles of each worker/user, for example). Workers/users may be identified by extracting landmarks or features from the image data of workers'/users' faces. This may also include analyzing the relative position, size, and/or shape of the eyes, nose, cheekbones, and jaw. Further, the facial recognition software may employ a variety of techniques to identify workers, including geometric approaches, photometric approaches, three dimensional approaches, skin texture approaches, and/or the like. Thus, after capturing image data of a worker, the monitoring computing entity 100 or other appropriate computing entity (e.g., in some cases the imaging device) can determine the identity of the corresponding worker/user, such as determining the identity of the worker in the captured image data as being that of package loader/unloader E8675309.

In one embodiment, with the identity of the corresponding worker/user determined (e.g., package loader/unloader E8675309), the appropriate computing entity (e.g., monitoring computing entity 100) can record the same as the location of the worker/user at the date and time stamp of the image data (e.g., store location data for the worker). For example, the monitoring computing entity 100 can record the location of package loader/unloader E8675309 as being the location of the corresponding imaging device or zone of interest (e.g., restroom 7) at 15:13:17 on Nov. 9, 2013— based on the date and time stamp from the image data (e.g., 15:13:17 T 11:20:47 UTC). Such embodiments allow the location and/or movement of users/workers to be monitored and tracked using image data.

In yet another embodiment, a geographic area, facility, or work area (e.g., kitchen, cook station, trailer, sorting area, etc.) may include one or more RFID readers/interrogators to track or monitor the location of workers/users. As noted, the RFID readers/interrogators can be positioned throughout facilities or work areas, such as at each door, entryway, hallway, access point, or every 10-15 feet, and/or the like. The one or more RFID readers/interrogators can transmit/send a signal/request (to be received by RFID tags/sensors within the read range) on a periodic, continuous, or regular basis or in response to certain triggers (e.g., performing a recurring activity). For example, in one embodiment, the one or more RFID readers/interrogators can transmit/send a signal/request to be received by RFID tags/sensors within the read range continuously, every second, every 5 seconds, every 10 seconds, and/or the like. In another embodiment, the one or more RFID readers/interrogators can transmit/send a signal/request to be received by RFID tags/sensors within the read range in response to certain triggers, such as a user/worker entering or exiting a geofenced area, such as a facility, doorway, entryway, hallway, work area, and/or the like or performing a recurring activity.

In one embodiment, in response to (e.g., after) an appropriate computing entity (e.g., an RFID reader/interrogator) transmitting/sending a signal/request to be received by RFID tags/sensors within the computing entity's read range, RFID tags/sensors within the read range can receive the signal/request. In some embodiments, receipt of the signal/request can be sufficient to power RFID tags/sensors to transmit/send responses to the signal/request. In other embodiments, the RFID tags/sensors may include a power source such that the RFID tags/sensors can transmit/send responses to the signal/request based on their own power. In any case, RFID tags/sensors that receive the signal/request can transmit/send a response to the appropriate computing entity.

In one embodiment, the responses from the RFID tags/sensors may include minimal information/data. For example, each RFID tag/sensor within the read range may transmit/send a response that includes a user/worker ID (e.g., C593, E8675309, or S128). By way of example, an RFID tag/sensor begin worn or carried by package loader/unloader E8675309 may respond to the signal/request by transmitting/sending a response with its user/worker ID (e.g., E8675309).

In one embodiment, the appropriate computing entity (e.g., an RFID reader/interrogator) can receive the responses transmitted/sent by the RFID tags/sensors within its read range. After receiving such a response, the response can be date and time stamped and transmitted/sent to the appropriate computing entity (e.g., monitoring computing entity 100). With the response, the appropriate computing entity (e.g., monitoring computing entity 100) can record the scan to track the location and/or time of the response for the user/worker. For example, if the response was received from entryway 12IUX and date and time stamped with 2013-11-09 T 15:13:17 UTC, the monitoring computing entity 100 can record the same as the location of package loader/unloader E8675309 at 15:13:17 on Nov. 9, 2013 (e.g., store location data for the worker in associated with worker data). Thus, RFID readers/interrogators throughout a geographic area, facility, or work area (e.g., kitchen, cook station, trailer, sorting area, etc.) can record user/worker IDs along with corresponding date and time stamps and provide the same to the appropriate computing entity (e.g., monitoring computing entity 100) to track and monitor the location and/or movement of the users/workers.

The monitoring computing entity 100 can then create, update, revise, and store records of worker data and/or location data. Such information/data (worker data and/or location data) may be stored in one or more records corresponding to a worker, worker group, work period, and/or the like.

3. Analysis/Segmentation of Worker Data, Activity Data, and Location Data

In one embodiment, the monitoring computing entity 100 can analyze/segment activity data, worker data, and/or location data corresponding to one or more workers and/or one or more work time periods separately and/or in relation to one another (Block 405 of FIG. 4). The work time periods may be input by a user (e.g., a supervisor reviewing the performance of loaders/unloaders or a restaurant owner or manager reviewing the productivity of chefs or servers). With the relevant work time periods identified, the monitoring computing entity 100 can identify/determine segments of interest, such as segments of inactivity that exceed one or more configurable thresholds that may represent unproductive or insufficient performance by one or more workers (Block 410 of FIG. 4). Continuing with the above example, the monitoring computing entity 100 can receive input via a user computing entity 105 indicating that the particular time period of interest is Nov. 9, 2013, for both the shipping carrier and restaurant examples.

The monitoring computing entity 100 may then request, retrieve, or otherwise obtain access to the relevant records. For example, in the shipping carrier context, the monitoring computing entity 100 may request, retrieve, or otherwise obtain access to the records with the relevant activity data, such as the records for all packages loaded or unloaded on Nov. 9, 2013, or all packages that loader/unloader E8675309 loaded or unloaded on Nov. 9, 2013 (FIGS. 5 and 6). Additionally, the monitoring computing entity 100 may also request, retrieve, or otherwise obtain access to the records with the relevant worker data and/or location data, such as the work record for package loader/unloader E8675309 dated Nov. 9, 2013 (FIG. 9). In the restaurant context, the monitoring computing entity 100 may request, retrieve, or otherwise obtain access to the records with the relevant activity data, such as the records for all orders entered and completed at a particular location on Nov. 9, 2013, or all orders prepared by chef C593 on Nov. 9, 2013 (FIGS. 7 and 8). Additionally, the monitoring computing entity 100 may also request, retrieve, or otherwise obtain access to the work records with the relevant worker data and/or location data, such as the record for chef C593 dated Nov. 9, 2013 (FIG. 10). With such records, the monitoring computing entity 100 can analyze the activity data, worker data, and/or location data corresponding to one or more work time periods separately and/or in relation to one another (Block 405 of FIG. 4).

In one embodiment, a work period for a worker may be divided into a start-of-work segment, a work segment, and an end-of-work segment (e.g., segments of interest). In one embodiment, the monitoring computing entity 100 can associate or identify these segments according to the following logic. The start-of-work segment may be associated or identified by the monitoring computing entity 100 from the start time in the worker data from the worker's corresponding record for the work period (e.g., for Nov. 9, 2013) indicating that he or she began working (e.g., from the worker data) followed by the first recurring activity being recorded in the activity data for the work period (e.g., scanning a first package or completing a first order for the work period from the activity data). The work segment may be associated or identified by the monitoring computing entity 100 from the first recurring activity being recorded in the activity data for the work period (e.g., scanning a first package or completing a first order for the work period from the activity data) to the last recurring activity being recorded in the activity data for the work period (e.g., scanning a last package or completing a last order for the work period from the activity data). Similarly, the end-of-work segment may be associated or identified by the monitoring computing entity 100 from the last recurring activity being recorded in the activity data for the work period (e.g., scanning a last package or completing a last order for the work period from the activity data) followed by the end time in the worker data and location from the worker's corresponding record for the work period (e.g., for Nov. 9, 2013) indicating that he or she stopped working (e.g., from the worker data) and where he or she stopped working (e.g., from the location data).

In one embodiment, the monitoring computing entity 100 can then determine whether there are any segments of interest, such as segments of inactivity during the work segment that meet or exceed one or more configurable thresholds and the location of the worker during any segments of inactivity. The configurable thresholds may be 30 seconds, 180 seconds, 5 minutes, 15 minutes, and/or any other time period to adapt to various needs and circumstances. In the shipping carrier example, for instance, the monitoring computing entity 100 may determine whether there are any segments of inactivity that meet or exceed 180 seconds. In one embodiment, this may be because packages can be loaded and unloaded at a high rate, and an inactivity segment of 180 seconds or more may indicate that the loader is not performing at capacity. In the restaurant context, though, the monitoring computing entity 100 may determine whether there are any segments of inactivity that meet or exceed 15 minutes. In one embodiment, this may be because preparing entrées for a table may take a considerably more time than placing packages on a conveyor or into a container, for instance. Thus, the configurable threshold may be much greater in the restaurant context.

As mentioned, such configurable thresholds can be configured by a user (e.g., a supervisor reviewing the performance of loaders/unloaders or a restaurant owner or manager reviewing the productivity of chefs or servers). For instance, a user may specify or adjust the configurable thresholds before, during, and/or after the analysis. Thus, when the user wants to identify short segments of inactivity, such as 20 seconds, the user can provide such input via the user computing entity 105 that is passed to the monitoring computing entity 100. In another embodiment, where a user wants to identify only long segments of inactivity, such as 5 minutes (or longer), the user can provide such input via the user computing entity 105 that is passed to the monitoring computing entity 100. With the configurable thresholds, the monitoring computing entity 100 can compare the duration of each segment of inactivity to the relevant configurable thresholds and identify all segments of inactivity meeting or exceeding the threshold during the work segment.

Continuing with the above examples, in the shipping context, the monitoring computing entity 100 can analyze the scan times of each package scanned by package loader/unloader E8675309 during the work segment or work period in a sequential manner. For instance, package loader/unloader E8675309 scanned package 1Z23456789 at 11:20:35 and package 1Z987654321 at 11:20:47. Thus, there is a gap in time of 12 seconds between scanning package 1Z123456789 and scanning package 1Z987654321. Any gaps between the sequentially-ordered scan times that meet or exceed the one or more configurable thresholds can be identified as segments of inactivity. Additionally, the monitoring computing entity 100 can identify the location of the worker during the identified segment of inactivity. The monitoring computing entity 100 can perform such analyses for all activities during the work period and/or work segment.

Further continuing with the above examples, in the restaurant context, the monitoring computing entity 100 can analyze the order completion times of orders completed by chef C593 during the work segment or work period in a sequential manner. And any gaps between the sequentially-ordered order completion times that meet or exceed the one or more configurable thresholds can be identified as segments of inactivity. For instance, chef C593 entered input that order 1634 was completed on 17:37:01 and completed order 1642 at 17:59:46. Thus, there is a gap in time 22 minutes and 42 seconds between completing order 1634 and completing order 1642. Any gaps between the sequentially-ordered order completion times that meet or exceed the one or more configurable thresholds can be identified as segments of inactivity. Additionally, the monitoring computing entity 100 can identify the location of the worker during the identified segment of inactivity based on the location data. The monitoring computing entity 100 can perform such analyses for all activities during the work period and/or work segment.

As noted, the monitoring computing entity 100 can identify the location of the worker during segments of inactivity based at least in part on the recorded location data. For example, for all segments of inactivity, the monitoring computing entity 100 can analyze the work record (e.g., worker data and location data) to determine if there are any recorded location events before, after, or during the segments of inactivity. Similarly, the monitoring computing entity 100 can analyze the work record (e.g., worker data and location data) to determine whether the worker was within or outside of a geographic area, facility, or work area (e.g., kitchen, cook station, trailer, sorting area, etc.). The monitoring computing entity 100 can analyze the work record (e.g., worker data and location data) to determine how long the worker was within or outside of a geographic area, facility, or work area (e.g., kitchen, cook station, trailer, sorting area, etc.).

Additionally, the monitoring computing entity 100 can identify the location of a worker during work segments based at least in part on the recorded location data. For example, for all work segments, the monitoring computing entity 100 can analyze the work record (e.g., worker data and location data) to identify the recorded location events during the work segment. With such data, the monitoring computing entity 100 can analyze the work record (e.g., worker data and location data) to determine whether the worker was within or outside of a geographic area, facility, or work area (e.g., kitchen, cook station, trailer, sorting area, etc.). The monitoring computing entity 100 can analyze the work record (e.g., worker data and location data) to determine how long the worker was within or outside of a geographic area, facility, or work area (e.g., kitchen, cook station, trailer, sorting area, etc.). Thus, the monitoring computing entity 100 can determine the total time or average amount of time within or outside of a geographic area, facility, or work area (e.g., kitchen, cook station, trailer, sorting area, etc.). In one embodiment, the monitoring computing entity 100 identifies segments in which a worker was within or outside of a geographic area, facility, or work area (e.g., kitchen, cook station, trailer, sorting area, etc.) that meets or exceeds one or more of the configurable thresholds for a given instance or work segment.

In one embodiment, to do so, geofences may be defined around the geographic areas, facilities, or work areas (e.g., kitchens, cook stations, trailers, sorting areas, etc.) by, for example, the latitude and longitude coordinates associated with various points along the perimeter of the geographic areas, facilities, or work areas. Alternatively, geofences may be defined based on latitude and longitude coordinates of the center, as well as the radius, of the geographic areas, facilities, or work areas (e.g., kitchens, cook stations, trailers, sorting areas, etc.). Such areas, and therefore the geofences, may be any shape including, but not limited to, a circle, square, rectangle, an irregular shape, and/or the like.

In one embodiment, if the monitoring computing entity 100 identifies (a) segments of inactivity meeting or exceeding one or more configurable thresholds or (b) segments in which a worker was within or outside of a geographic area, facility, or work area that meets or exceeds one or more of the configurable thresholds, the monitoring computing entity 100 can tag or assign an alert identifier to the segments meeting or exceeding one or more of the configurable thresholds. For instance, in one embodiment, the tags or assigned alert identifiers are metadata identifying particular segments of inactivity or segments in which a worker was within or outside of a geographic area for an extended period of time. Additionally, the monitoring computing entity 100 can tag or assign one or more location identifiers to the segments of inactivity that correspond to the locations during the inactivity segments (e.g., based on matching the time stamps from the location data with the times of the inactivity segments)—or other segments as described herein. Thus, the monitoring computing entity 100 can tag or assign alert identifiers to various segments along with location identifiers that indicate, for example, that before, after, or during the segments, the worker was in entryway 12IUX, restroom 7, hallway 27GF3, and/or the like. This may help in identifying particular patterns of behavior.

In another embodiment, if the monitoring computing entity 100 identifies segments as meeting or exceeding one or more configurable thresholds, before tagging or assigning an alert, the monitoring computing entity 100 analyze the worker data to determine whether there is any input associated with the segments. For example, during this work period, package loader/unloader E8675309 took a lunch break from 14:09:46-14:40:23. Package loader/unloader E8675309 also input that he or she had a period of inactivity from 15:13:17-15:33:46 that corresponds to reason code 11. Similarly, chef C593 took three breaks: (1) Break 1 from 15:39:46-15:50:23; (2) Break 2 from 17:11:43-17:39:56; and (3) Break 3 from 21:42:46-22:07:35. Thus, the monitoring computing entity 100 analyze the worker data to determine whether there is a complete or partial overlap, for example, between any identified segments and input of breaks, lunches, and/or other reasons for inactivity or location positions or movements, such as assisting a coworker or a mechanical malfunction of equipment. The monitoring computing entity 100 can also analyze the worker data to determine whether there is input of breaks, lunches, and/or other reasons proximately before or proximately after the identified segments. If the identified segment is justified for a break, for example, the monitoring computing entity 100 may tag or assign an alert accordingly. Similarly, if the identified segment is not justified, the monitoring computing entity 100 may tag or assign an alert. Additionally, the monitoring computing entity 100 can tag or assign one or more location identifiers to the identified segments and/or input associated with the identified segments. For instance, the monitoring computing entity 100 can tag or assigned alert identifiers to segments of inactivity and/or input associated with the segments of inactivity with location identifiers that indicate the location of the worker, for example, before, after, or during the segment of inactivity and/or input associated with the segments of inactivity. Thus, if there is an activity segment of 7 minutes and the worker input that he or she was in the restroom, the location data can be used to determine whether the worker was actually in the restroom. This may help in identifying particular patterns of behavior. As will be recognized, a variety of other approaches and techniques can be used to adapt to various needs and circumstances.

In another embodiment, if the monitoring computing entity 100 identifies segments meeting or exceeding one or more configurable thresholds, before tagging or assigning an alert to the segments, the monitoring computing entity 100 can analyze the activity data to determine whether the identified segment was associated with worker movement, e.g., a worker moving from one end of a warehouse to another. This is provided that there is no reason or code associated with the identified segment. For example, during this work period, if package loader/unloader E8675309 loaded package 1Z123456789 into Trailer 8ZR3547GF at 11:20:35 and package 1Z999999999 into Trailer 8ZR33333GF at 11:27:47, the monitoring computing entity 100 may determine that the time gap between 11:20:35 and 11:27:47 corresponds to the worker walking, driving, or otherwise traveling from Trailer 8ZR13547GF to Trailer 8ZR33333GF. That is, the time is associated with a movement segment. As will be recognized, such an embodiment does not require the use of location data to make such a determination, although in other embodiments location data may be used. In certain embodiments, in identifying movement segments, the monitoring computing entity 100 can consider the relative locations of the trailers, facilities, equipment, and/or the like.

In one embodiment, if the monitoring computing entity 100 identifies segments meeting or exceeding one or more configurable thresholds, the monitoring computing entity 100 can tag or assign an alert identifier and one or more location identifiers to the segments of meeting or exceeding one or more of the configurable thresholds—regardless of whether the monitoring computing entities 100 identifies a valid reason in the worker data for the identified segment. In another embodiment, if the monitoring computing entity 100 identifies segments meeting or exceeding one or more configurable thresholds, the monitoring computing entity 100 can tag or assign an alert identifier and one or more location identifiers to the segments meeting or exceeding one or more of the configurable thresholds—only if the monitoring computing entity does 100 not identify a valid reason in the worker data for the identified segment. In another embodiment, if the monitoring computing entity 100 identifies segments meeting or exceeding one or more configurable thresholds, the monitoring computing entity 100 can tag or assign an alert identifier and one or more location identifiers to the identified segments and further indicate the corresponding reason or code. The monitoring computing entity 100 can also tag or assign an alert identifier and one or more location identifiers to the segments of movement and/or a variety of other segments that are identifiable/determinable based at least in part on the activity data, worker data, and/or location data.

In one embodiment, the monitoring computing entity 100 can generate an alert indicating to a user that the monitoring computing entity 100 has analyzed activity data or worker data that meets or exceeds one or more of the configurable thresholds or location data that is outside a geographic area, facility, or work area (e.g., kitchen, cook station, trailer, sorting area, etc.). For example, in one embodiment, the monitoring computing entity 100 can send an email, text message, pop-up alert, and/or the like with such an indication. In yet another embodiment, the monitoring computing entity 100 may generate an alert via a user interface (e.g., for display via a user computing entity 105) indicating the identified inactivity segments.

The monitoring computing entity 100 can also determine the number of recurring activities performed for a work period, work segment, and/or the like. This may include determining the number of packages loaded or unloaded during a work period or work segment by an individual worker, by a team of workers, at a particular cargo bay, or within a facility. In another example, this may include determining the number of entrées, sides, and/or salads prepared by an individual chef, by a team of chefs, or by a restaurant for a work period or work segment. Further, the monitoring computing entity 100 can compare workers, worker groups, facilities, performance metrics, benchmarks, and/or the like that may be of interest to users (e.g., a supervisor reviewing the performance of loaders/unloaders (e.g., the number or packages loaded or unloaded per hour) or a restaurant owner or manager reviewing the productivity of chefs or servers (e.g., the number of entrées prepared per hour))—such as the histogram shown in FIGS. 11-13.

4. Display of Segmented Data (Activity Data, Worker Data, Location Data)

In one embodiment, the monitoring computing entity 100 can cause display of various segments identified/determined from the worker data, activity data, and/or location data (Block 415 of FIG. 4). For example, this may allow users to view segments of interest meeting or exceeding one or more configurable thresholds. Similarly, the monitoring computing entity 100 can cause display of the movement of workers/users on a graphical map of geographic areas, facilities, or work areas (e.g., kitchens, cook stations, trailers, sorting areas, etc.). This may allow for users to trace or provide an animation of the movement of one or more workers/users throughout geographic areas, facilities, or work areas (e.g., kitchens, cook stations, trailers, sorting areas, etc.). According to one embodiment, such may be displayed via a display or user interface via a user computing entity 105, similar to those illustrated in FIGS. 11-13.

Figure 11:
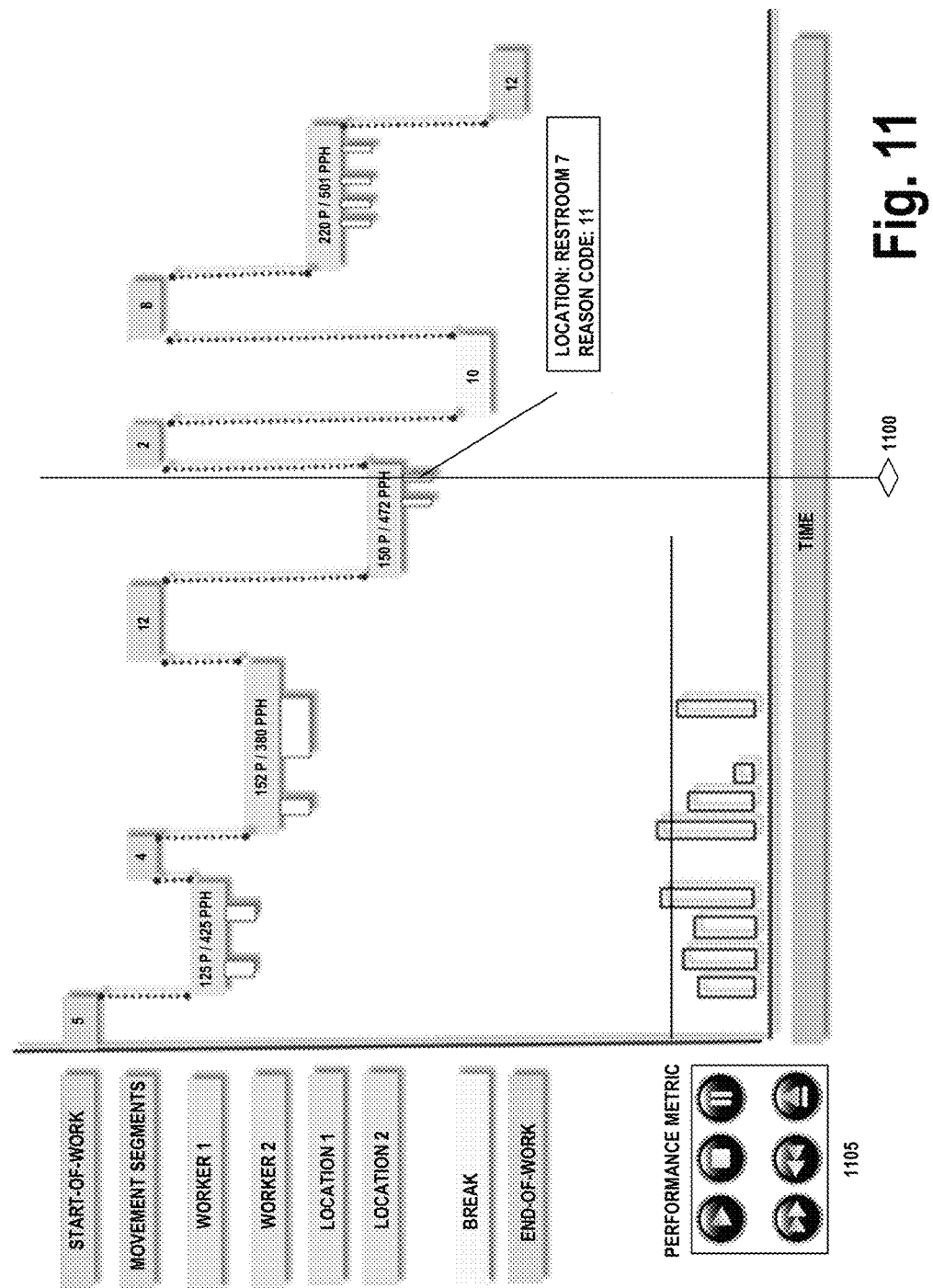
Figure 12:
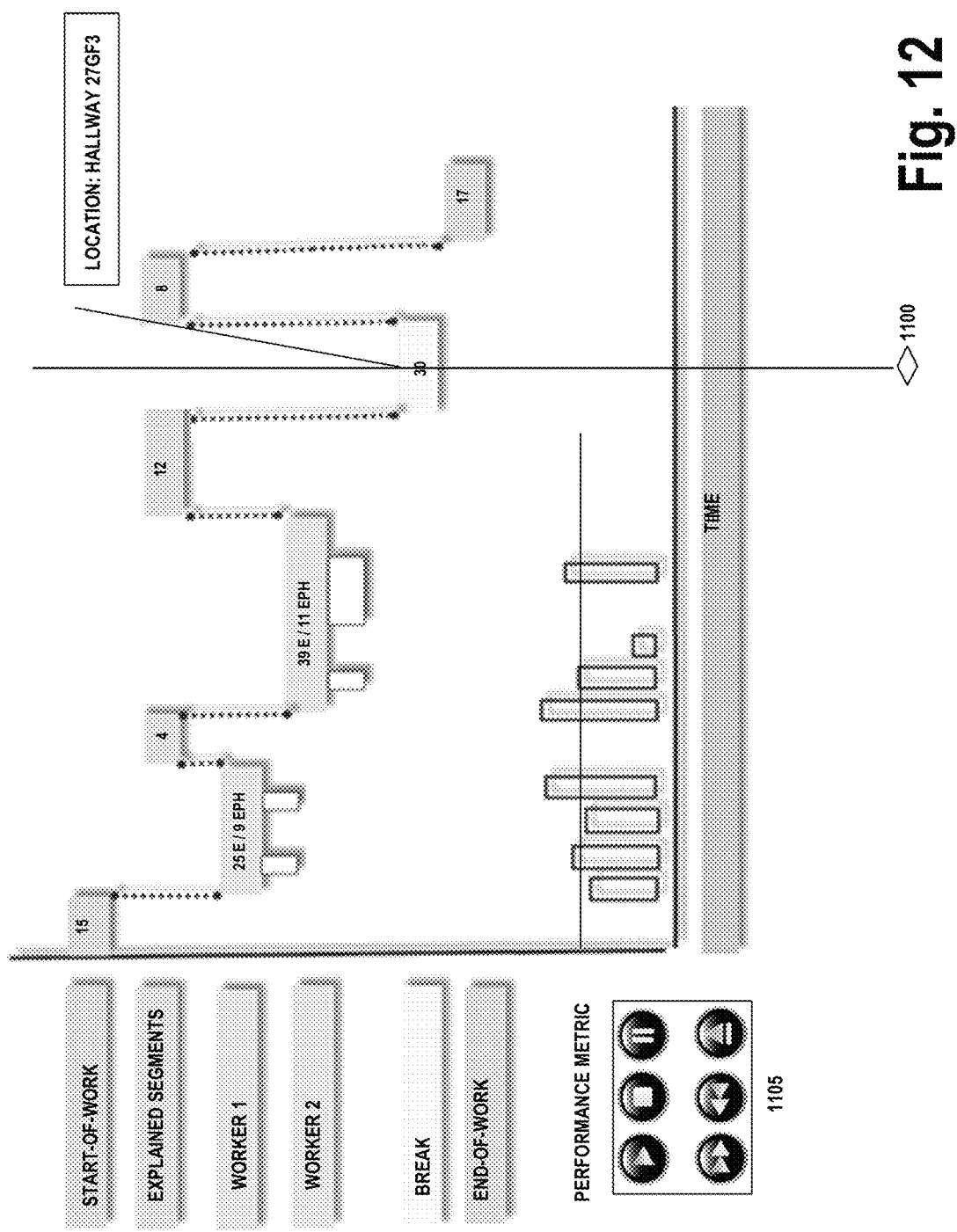
Figure 13:
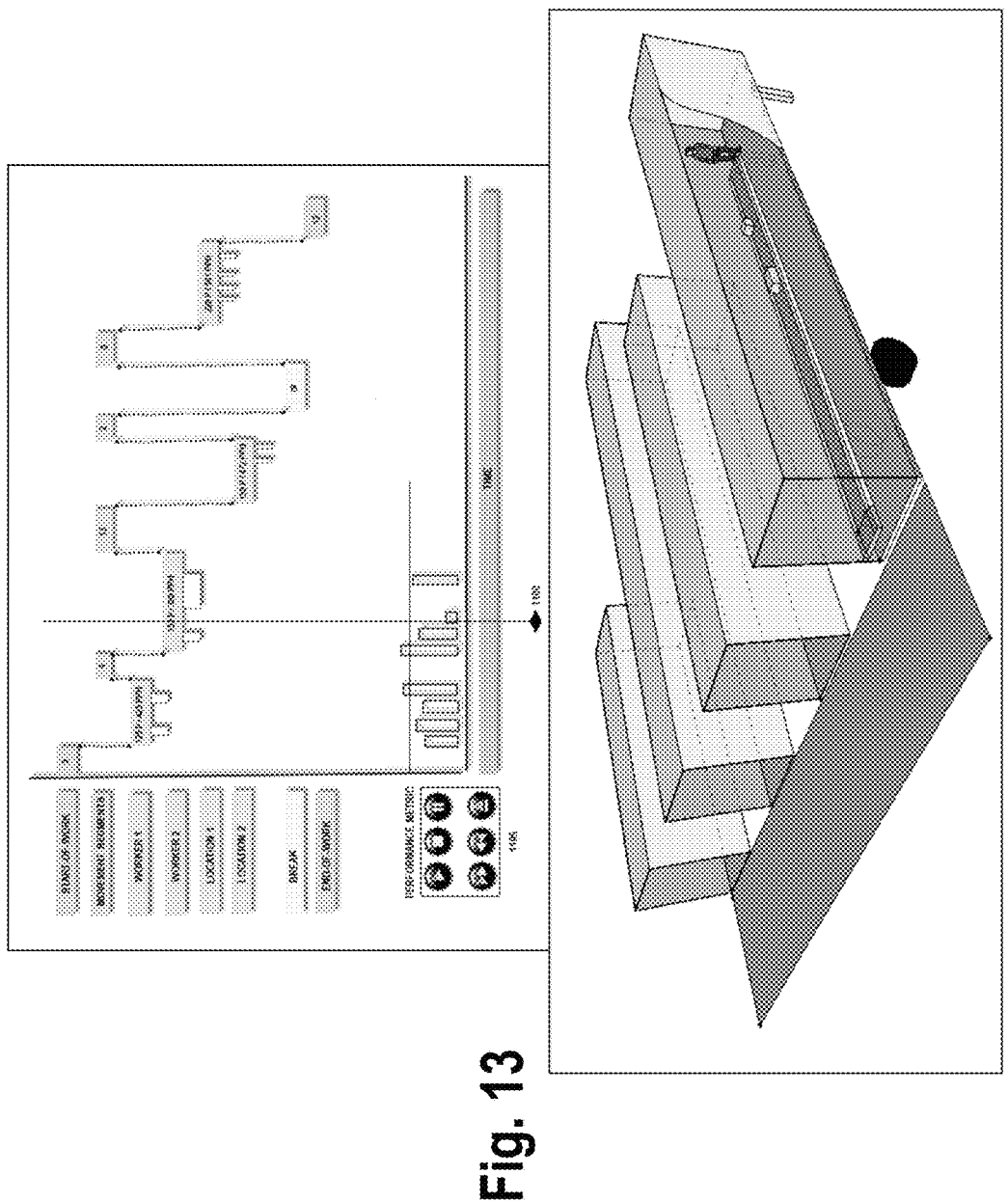

Such a display or user interface may provide information/data such as the date and time each segment occurred, the start time of each segment, the duration of each segment, the end time of each segment, data corresponding to the segment (e.g., inactivity reasons or codes), the locations associated with each segment, and/or the like (see FIGS. 11-13). In a further embodiment, the interface may be configured such that the user may select a particular segment (e.g., with a computer mouse, other input, such as hovering over or moving the current time indicator 1100) and view the worker data, activity data, and/or location data collected proximately before, proximately after, or during the particular segment. In this embodiment, the user may be provided with the option of browsing the worker data, activity data, and/or location data proximate to or during the specific segment to determine the source of any potential inefficiencies and/or the like.

As shown in FIG. 11, the interface can cause display of activity data, worker data, and location data corresponding to two loaders/unloaders and two locations. The interface also causes display of the start-of-work segments, movement segments, work segments, inactivity segments (the white blocked sections underneath the work segments), break segments, and end-of-work segments. As noted, the interface may be configured such that the user may select a particular segment (moving the current time indicator 1100) and view the worker data, activity data, and/or location data collected proximately before, proximately after, or during the particular segment. FIG. 11 shows the number of packages handled in each work segment, the average number of packages handled per hour in each work segment, and a histogram with a performance metric compared to the packages loaded every X minutes, such as the number of packages loaded every five minutes.

As shown in FIG. 12, the interface can cause display of activity data, worker data, and location data corresponding to two chefs. The interface also causes display of the start-of-work segments, explained segments (inactivity segments with a corresponding inactivity reason or code), work segments, inactivity segments (the white blocked sections underneath the work segments), break segments, and end-of-work segments. As noted, the interface may be configured such that the user may select a particular segment (moving the current time indicator 1100) and view the worker data, activity data, and/or location data collected proximately before, proximately after, or during the particular segment. FIG. 12 shows the number of entrées completed in each work segment, the average number of entrées completed per hour in each work segment, and a histogram with a performance metric compared to the number entrées completed every X minutes, such as the number of entrées completed every 15 minutes.

According to various embodiments, the display or user interface may also include a playback menu. For example, in one embodiment, the display or user interface can be configured to animate the location of one or more workers on a graphical map in geographic areas, facilities, or work areas (e.g., kitchens, cook stations, trailers, sorting areas, etc.) in response to a user's selection of play on the playback menu 1105 (Block 415 of FIG. 4). In such embodiments, the display or user interface "plays" the loaded location data such that the current time indicator 1100 moves across the display or user interface at a predefined speed in relation to the time markers (e.g., a real-time setting, slow-motion setting, fast-motion setting)—see FIG. 13. As the current time indicator 1100 moves across the display or user interface, the monitoring computing entity 100 can position the worker's movements and/or location on a graphical map throughout a geographic area, facility, or work area (e.g., kitchen, cook station, trailer, sorting area, etc.) such that the worker's location can always represent the location the worker at the time indicated by the current time indicator 1100. As such, the playback menu playback menu 1105 allows the user to view the movement on a graphical map in conjunction with the current time indicator 1100 and the worker's location simultaneously, as shown in FIG. 13. As shown in FIGS. 11-13, the current time indicator 1100 comprises a vertical bar disposed on the display or user interface. According to various embodiments, the location of the worker on the graphical map of the display or user interface corresponds to the position of the current time indicator 1100.

In one embodiment, the display or user interface can adjust the position of the current time indicator 1100 in response to the user's input. For example, when the user selects the appropriate action on the playback menu 1105 or drags the current time indicator 1100 itself, the display or user interface first moves the current time indicator 1100 in response to the user input and displays the corresponding current time in the display or user interface. Then, the location of the worker at the new current time setting (e.g., by reviewing the loaded operational data and identifying location data corresponding to the current time setting, or time nearest to the current time setting) can be reposition on the graphical map at the identified location on the display or user interface. As will be recognized, a variety of other approaches and techniques may be used to cause display of information/data to adapt to various needs and circumstances.

In one embodiment, the interface can cause provide a zoom or magnification feature for providing more detailed or granular information/data about worker data, activity data, and/or location data. In one embodiment, the zoom feature may be accessed by double clicking or tapping, mousing over, pinching, various touch-screen gestures, and/or the like the current time indicator 1100 or the playback menu 1105. In response to the appropriate input, the worker data, activity data, and/or location data can be provided at a more granular level and/or increase the size of the displayed portion. For example, instead of displaying activity or inactivity in terms of hours in the display or user interface, minutes or seconds can be displayed as the references with an increased or magnified view. Similarly, instead of displaying activity or inactivity for a facility or work area in the display or user interface, the activity or inactivity of individual workers can be displayed with an increased or magnified view. Thus, the zoom or magnification feature may be used to provide more detailed or granular information/data about start-of-work segments, movement segments, work segments, inactivity segments, break segments, end-of-work segments, and/or the like. As will be recognized, a variety of other approaches and techniques may be used to provide a zoom or magnification feature that causes display of information/data to adapt to various needs and circumstances.

IV. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for monitoring recurring activities, the method comprising:

receiving, via one or more processors of a network device, location data and activity data recorded by a communication device, the location data and the activity data corresponding to a worker and a work period in which the worker performed one or more recurring activities predesignated as corresponding activities performed periodically within the work period;

detecting a geolocation of the communication device, from location data captured by a location detection device, at which the worker performed the recurring activities;

determining, via the one or more processors, (i) a number of packages handled by the worker during the work period and (ii) an average number of packages handled per hour by the worker during the work period;

receiving, via the one or more processors, work data corresponding to the worker and the work period in which the worker performed the one or more recurring activities;

identifying, via the one or more processors, a plurality of inactivity segments during the work period that each meet a configurable threshold based at least in part on the activity data;

detecting, via the one or more processors, that the plurality of inactivity segments represents a time period for which the worker did not perform the one or more recurring activities during the work period even though a detection indicates the worker performed one or more other activities other than the recurring activities during one or more of the inactivity segments during the work period;

identifying, via the one or more processors, a location of the worker during at least one of the one or more inactivity segments based in part on analyzing the location data;

determining, via the one or more processors, that the other activities, other than the recurring activities, detected during at least one of the plurality of inactivity segments for the work period corresponds to a predefined numerical inactivity reason code, denoting the other activities, based at least in part on analyzing the work data; and providing visual content to a display device to display (1) the detected geolocation at which the worker performed the recurring activities, (2) the activity data indicating, in part, (a) the determined number of packages handled by the worker during the work period and (b) the average number of packages handled per hour by the worker during the work period, (3) the at least one inactivity segment and the predefined numerical inactivity reason code, (4) a histogram of a number of packages loaded onto a loader during a recurring predetermined time period, visually on a graph relative to time, via a user interface of the display device of the network device to enable user interaction with the graph, and (5) a graphical map illustrating a plurality of locations of the worker during the work period, wherein the graphical map is associated with a playback capability that, when activated, provides an animation of movements of the worker at each of the plurality of locations corresponding to a current time indicator.

2. The method of claim 1 further comprising assigning an alert to at least one of the one or more inactivity segments, wherein each alert further identifies a location of the corresponding inactivity segment.

3. The method of claim 1 further comprising causing display of at least a portion of the inactivity segments and at least a portion of the corresponding activity data and location data.

4. The method of claim 3 further comprising increasing the granularity of the activity data and the location data displayed in response to user input.

5. The method of claim 1 further comprising:
determining the plurality of locations of the worker during the work period based at least in part on the location data; and
providing the graphical map for display of the plurality of locations of the worker during the work period.

6. The method of claim 1, further comprising:
determining whether the predefined numerical inactivity reason code is identified as a designated valid reason for the other activities, performed by the worker, detected during the at least one inactivity segment in the work data.

7. The method of claim 1, further comprising:
determining that one or more of the plurality of inactivity segments that meet or exceed the configurable threshold denotes unproductive performance by the worker.

8. The method of claim 1, wherein:
the recording of the activity data by the communication device triggers the recording of the location data, by the communication device, that corresponds to the one or more recurring activities performed by the worker.

9. The method of claim 1, further comprising:
providing visible data, to the display device, indicating work content pertaining to the other activities detected during the at least one inactivity segment in response to detecting an indication of a selection, via the user interface, of the at least one inactivity segment on the graph.

10. An apparatus comprising at least one processor and at least one memory including computer program code, the at least one memory and the computer program code configured to, with the processor, cause the apparatus to at least:
receive location data and activity data recorded by a communication device, the location data and the activity data corresponding to a worker and a work period in which the worker performed one or more recurring activities predesignated as corresponding activities performed periodically within the work period;
detect a geolocation of the communication device, from location data captured by a location detection device, at which the worker performed the recurring activities;
determine (i) a number of packages handled by the worker during the work period and (ii) an average number of packages handled per hour by the worker during the work period;
receive work data corresponding to the worker and the work period in which the worker performed the one or more recurring activities;
identify a plurality of inactivity segments during the work period that each meet a configurable threshold based at least in part on the activity data;
detect that the plurality of inactivity segments represents a time period for which the worker did not perform the one or more recurring activities during the work period even though a detection indicates the worker performed one or more other activities other than the recurring activities during one or more of the inactivity segments during the work period;
identify a location of the worker during at least one of the one or more inactivity segments based in part on analyzing the location data;
determine that the other activities, other than the recurring activities, detected during at least one of the plurality of inactivity segments for the work period corresponds to a predefined numerical inactivity reason code, denoting the other activities, based at least in part on analyzing the work data; and
provide visual content to a display device to display (1) the detected geolocation at which the worker performed the recurring activities, (2) the activity data indicating, in part, (a) the determined number of packages handled by the worker during the work period and (b) the average number of packages handled per hour by the worker during the work period, (3) the at least one inactivity segment and the predefined numerical inactivity reason code, (4) a histogram of a number of packages loaded onto a loader during a recurring predetermined time period, visually on a graph relative to time, via a user interface of the display device of the network device to enable user interaction with the graph, and (5) a graphical map illustrating a plurality of locations of the worker during the work period, wherein the graphical map is associated with a playback capability that, when activated, provides an animation of movements of the worker at each of the plurality of locations corresponding to a current time indicator.

11. The apparatus of claim 10, wherein the memory and computer program code are further configured to, with the processor, cause the apparatus to assign an alert to at least one of the one or more inactivity segments, wherein each alert further identifies a location of the corresponding inactivity segment.

12. The apparatus of claim 10, wherein the memory and computer program code are further configured to, with the processor, cause the apparatus to cause display of at least a portion of the inactivity segments and at least a portion of the corresponding activity data and location data.

13. The apparatus of claim 12, wherein the memory and computer program code are further configured to, with the processor, cause the apparatus to increase the granularity of the activity data and the location data displayed in response to user input.

14. The apparatus of claim 10, wherein the memory and computer program code are further configured to, with the processor, cause the apparatus to:
determine the plurality of locations of the worker during the work period based at least in part on the location data; and
provide the graphical map for display of the plurality of locations of the worker during the work period.

15. The apparatus of claim 10, wherein the memory and computer program code are further configured to, with the processor, cause the apparatus to:
determine whether the predefined numerical inactivity reason code is identified as a designated valid reason for the other activities, performed by the worker, detected during the at least one inactivity segment in the work data.

16. The apparatus of claim 10, wherein the memory and computer program code are further configured to, with the processor, cause the apparatus to:
determine that one or more of the plurality of inactivity segments that meet or exceed the configurable threshold denotes unproductive performance by the worker.

17. The apparatus of claim 10, wherein:
the recording of the activity data by the communication device triggers the recording of the location data, by the communication device, that corresponds to the one or more recurring activities performed by the worker.

18. The apparatus of claim 10, wherein the memory and computer program code are further configured to, with the processor, cause the apparatus to:
provide visible data, to the display device, indicating work content pertaining to the other activities detected during the at least one inactivity segment in response to detecting an indication of a selection, via the user interface, of the at least one inactivity segment on the graph.

19. A computer program product for monitoring recurring activities, the computer program product comprising at least one non-transitory computer-readable storage medium having computer-readable program code portions stored therein, the computer-readable program code portions comprising:
an executable portion configured to receive, via a network device, location data and activity data recorded by a communication device, the location data and the activity data corresponding to a worker and a work period in which the worker performed one or more recurring activities predesignated as corresponding activities performed periodically within the work period;
an executable portion configured to detect a geolocation of the communication device, from location data captured by a location detection device, at which the worker performed the recurring activities;
an executable portion configured to determine (i) a number of packages handled by the worker during the work period and (ii) an average number of packages handled per hour by the worker during the work period;
an executable portion configured to receive work data corresponding to the worker and the work period in which the worker performed the one or more recurring activities;
an executable portion configured to identify a plurality of inactivity segments during the work period that each meet a configurable threshold based at least in part on the activity data;
an executable portion configured to detect that the plurality of inactivity segments represents a time period for which the worker did not perform the one or more recurring activities during the work period even though a detection indicates the worker performed one or more other activities other than the recurring activities during one or more of the inactivity segments during the work period;
an executable portion configured to identify a location of the worker during at least one of the one or more inactivity segments based in part on analyzing the location data;
an executable portion configured to determine that the other activities, other than the recurring activities, detected during at least one of the plurality of inactivity segments for the work period corresponds to a predefined numerical inactivity reason code, denoting the other activities, based at least in part on analyzing the work data; and
an executable portion configured to provide visual content to a display device to display (1) the detected geolocation at which the worker performed the recurring activities, (2) the activity data indicating, in part, (a) the determined number of packages handled by the worker during the work period and (b) the average number of packages handled per hour by the worker during the work period, (3) the at least one inactivity segment and the predefined numerical inactivity reason code, (4) a histogram of a number of packages loaded onto a loader during a recurring predetermined time period, visually on a graph relative to time, via a user interface of the display device of the network device to enable user interaction with the graph, and (5) a graphical map illustrating a plurality of locations of the worker during the work period, wherein the graphical map is associated with a playback capability that, when activated, provides an animation of movements of the worker at each of the plurality of locations corresponding to a current time indicator.

20. The computer program product of claim 19 further comprising an executable portion configured to cause the apparatus to assign an alert to at least one of the one or more inactivity segments, wherein each alert further identifies a location of the corresponding inactivity segment.

21. The computer program product of claim 19 further comprising an executable portion configured to cause the apparatus to cause display of at least a portion of the inactivity segments and at least a portion of the corresponding activity data and location data.

22. The computer program product of claim 21 further comprising an executable portion configured to increase the granularity of the activity data and the location data displayed in response to user input.

23. The computer program product of claim 19 further comprising:
an executable portion configured to determine the plurality of locations of the worker during the work period based at least in part on the location data; and
an executable portion configured to provide the graphical map for display of the plurality of locations of the worker during the work period.

24. The computer program product of claim 19, further comprising:
an executable portion configured to determine whether the predefined numerical inactivity reason code is identified as a designated valid reason for the other activities, performed by the worker, detected during the at least one inactivity segment in the work data.

25. The computer program product of claim 19, further comprising:
an executable portion configured to determine that one or more of the plurality of inactivity segments that meet or exceed the configurable threshold denotes unproductive performance by the worker.

26. The computer program product of claim 19, wherein:
the recording of the activity data by the communication device triggers the recording of the location data, by the communication device, that corresponds to the one or more recurring activities performed by the worker.

27. The computer program product of claim 19, further comprising:
an executable portion configured to provide visible data, to the display device, indicating work content pertaining to the other activities detected during the at least one inactivity segment in response to detecting an indication of a selection, via the user interface, of the at least one inactivity segment on the graph.

\* \* \* \* \*

UNITED STATES PATENT AND TRADEMARK OFFICE
CERTIFICATE OF CORRECTION

PATENT NO. : 10,229,375 B2
APPLICATION NO. : 13/921500
DATED : March 12, 2019
INVENTOR(S) : Mark J. Davidson et al.

Page 1 of 1

It is certified that error appears in the above-identified patent and that said Letters Patent is hereby corrected as shown below:

In the Specification

Column 04, Line 46: Please remove "coproces sing" and replace with --coprocessing--.

Column 09, Line 02: Please remove "8ZR13547 GF" and replace with --8ZR13547GF--.

Column 13, Line 08: Please remove "642" and replace with --1642--.

Column 13, Line 66: Please remove "121 UX" and replace with --12IUX--.

Column 14, Line 07: Please remove "2IUX" and replace with --12IUX--.

Column 18, Line 10: Please remove "1Z23456789" and replace with --1Z123456789--.

Column 20, Line 39: Please remove "8ZR3547GF" and replace with --8ZR13547GF--.

Signed and Sealed this
Twenty-third Day of July, 2019

Andrei Iancu
*Director of the United States Patent and Trademark Office*